(12) United States Patent
Gaal et al.

(10) Patent No.: US 6,570,530 B2
(45) Date of Patent: May 27, 2003

(54) METHOD AND APPARATUS PROVIDING IMPROVED POSITION ESTIMATE BASED ON AN INITIAL COARSE POSITION ESTIMATE

(75) Inventors: Peter Gaal, San Diego, CA (US); Alkinoos Vayanos, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/878,934

(22) Filed: Jun. 11, 2001

(65) Prior Publication Data

US 2002/0154056 A1 Oct. 24, 2002

Related U.S. Application Data

(60) Provisional application No. 60/273,570, filed on Mar. 5, 2001.

(51) Int. Cl.[7] .................................................. G01S 5/14
(52) U.S. Cl. ............................. 342/357.02; 342/357.06
(58) Field of Search ....................... 342/357.02, 357.12, 342/357.15, 357.06, 464, 463, 457; 701/213

(56) References Cited

U.S. PATENT DOCUMENTS

| | | | | |
|---|---|---|---|---|
| 5,373,298 A | * | 12/1994 | Karouby ................ | 342/357.02 |
| 5,444,450 A | * | 8/1995 | Olds et al. ............. | 342/357.02 |
| 5,825,328 A | | 10/1998 | Schipper et al. ............ | 342/357 |
| 6,084,544 A | * | 7/2000 | Camp, Jr. .............. | 342/357.15 |
| 6,104,978 A | * | 8/2000 | Harrison et al. ............ | 701/207 |
| 6,225,945 B1 | * | 5/2001 | Loomis ................. | 342/357.12 |
| 6,313,787 B1 | * | 11/2001 | King et al. ............. | 342/357.03 |

FOREIGN PATENT DOCUMENTS

| | | | | |
|---|---|---|---|---|
| WO | | 0065367 | 11/2000 | ............. G01S/5/02 |

* cited by examiner

Primary Examiner—Gregory C. Issing
(74) Attorney, Agent, or Firm—Philip Wadsworth; Charles Brown; Bruce W. Greenhaus

(57) ABSTRACT

Techniques for determining the location of a device based on an initial coarse position estimate for the device, which is derived based on initial (less accurate) estimates of the position of a plurality of transmitters. In one method, the coarse position estimate for the device and revised (more accurate) position estimates for the transmitters are received. A revised position estimate for the device is initialized (e.g., to the coarse position estimate). An update vector is next computed based on the initial and revised position estimates for the device and the initial and revised position estimates for the transmitters. The revised position estimate for the device is then updated based on the update vector. The computation for the update vector and the updating of the revised position estimate for the device can be repeated a number of times to achieve a more and more accurate estimate.

9 Claims, 5 Drawing Sheets

METHOD AND APPARATUS PROVIDING IMPROVED POSITION ESTIMATE BASED ON AN INITIAL COARSE POSITION ESTIMATE

RELATED APPLICATIONS

This application claims priority to a U.S. Provisional Application Ser. No. 60/273,570, filed on Mar. 5, 2001, and assigned to the assignee of the present application.

BACKGROUND

1. Field

The present invention relates generally to location of a device, and more particularly to techniques for providing an improved (i.e., more accurate) estimate of the location of the device based on an initial coarse position estimate.

2. Background

A common means by which to locate a device is to determine the amount of time required for signals transmitted from multiple sources at known locations to reach a receiver within the device to be located. One system that provides signals from a plurality of transmitters of known locations is the well-known Global Positioning Satellite (GPS) system. Satellites in the GPS system are placed in precise orbits according to a GPS master plan. The position of the GPS satellites can be identified by a number of different sets of information, some more accurate than others.

GPS satellites transmit a set of information, referred to as "Almanac", which includes less accurate information regarding the location of the satellites in the "constellation". Ground stations continuously monitor the GPS satellites to observe their variations in orbit. Once the satellite positions have been measured, the information is relayed back to the satellites. The satellites then transmit another set of information, referred to as "Ephemeris", which includes a higher accuracy version of the satellite orbits. Each satellite transmits the Almanac information for all satellites but the Ephemeris information only for itself.

A GPS receiver can receive and/or store an almanac that indicates where each of a number of satellites is located in the sky at a given time. A more accurate determination of the location of a GPS satellite can be made based on the Ephemeris and the time of day at which this information is available.

Both the Almanac and Ephemeris are valid for a limited amount of time. The Almanac information is considered to be accurate to approximately 3 kilometers for approximately one week from the time the Almanac is transmitted. The Ephemeris provides information regarding the satellite orbit with an accuracy of approximately 1 meter for approximately 2 hours. The error in both the Almanac and Ephemeris grows as the information ages. Accordingly, the location of the satellites based on this information is less and less accurate as the Almanac and Ephemeris age, unless updated information is received at appropriate intervals in time.

Without accurate information regarding the location of the satellites, the estimated location of a device, which may have been determined based on the receipt of signals transmitted from the satellites, may be inaccurate. Accurate information may be attained by receiving updates (continually or as necessary) from the satellites or from an alternative source. The alternative source may be a base station or position determining equipment (PDE) in a wireless communication system, either of which may have a GPS receiver capable of receiving the required information from the GPS satellites. However, valuable resources would be consumed for the device to be located to attain the information at regular intervals. In particular, power is required to transmit and receive the information, and bandwidth is required to transmit the information from a remote source to the device.

There is therefore a need in the art for techniques to accurately determine the position of a device with minimal expenditure of resources. This need is particularly acute when position determination is based on transmitters (e.g., GPS satellites) that move over time and when accurate locations of such transmitters are known only upon receiving updates from the transmitters or a source remote from the satellites and the device whose position is to be determined.

SUMMARY

Techniques to accurately determine the location of a receiver device based on an initial coarse position estimate, which may have been derived using less accurate information regarding the location of the transmitters (e.g., an old Almanac or old Ephemeris for the GPS satellites) are disclosed herein. In one embodiment of the disclosed method and apparatus, corrections to the coarse position estimate of a receiver device are made based on knowledge of: (1) information providing a relatively more accurate location of the transmitters; and (2) information providing a relatively less accurate location of the transmitters (e.g., the old Almanac and/or Ephemeris) used to derive the coarse position estimate. The corrections may be performed based on various correction algorithms, one of which is an iterative algorithm described in further detail below.

In accordance with one embodiment of the disclosed method and apparatus, a coarse position estimate for the device is received. The coarse position estimate may have been derived based on initial (less accurate) estimates of the position of a plurality of transmitters, such as GPS satellites. Revised (more accurate) position estimates for the transmitters are also received. The revised position estimate for the device is then initialized (e.g., to the coarse position estimate). An update vector is next computed based on the initial and revised position estimates for the device and the initial and revised position estimates for the transmitters. The revised position estimate for the device is then updated based on the update vector. The computation for the update vector and the updating of the revised position estimate for the device can be repeated a number of times (e.g., until the magnitude of the update vector is within a particular threshold) to achieve a more and more accurate estimate of the actual position of the device.

In accordance with one embodiment of the disclosed method and apparatus, the update vector is computed by performing the steps of: (1) calculating a set of measurements based on the revised position estimate for the device and the revised position estimates for the transmitters; (2) deriving an intermediate position estimate for the device based on the set of measurements and the initial position estimates for the transmitters; (3) determining a first geometry matrix based on the initial position estimates for the transmitters and the intermediate position estimate for the device; (4) determining a second geometry matrix based on the revised position estimates for the transmitters and the revised position estimate for the device; and (5) computing the update vector based on the intermediate and revised position estimates for the device and the first and second geometry matrices. These steps are described in further detail below.

The disclosed method and apparatus further provides other aspects, embodiments, and features, as described in further detail below.

BRIEF DESCRIPTION OF THE DRAWINGS

The features, nature, and advantages of the present invention will become more apparent from the detailed description set forth below when taken in conjunction with the drawings in which like reference characters identify like elements.

DETAILED DESCRIPTION

Figure 1A:
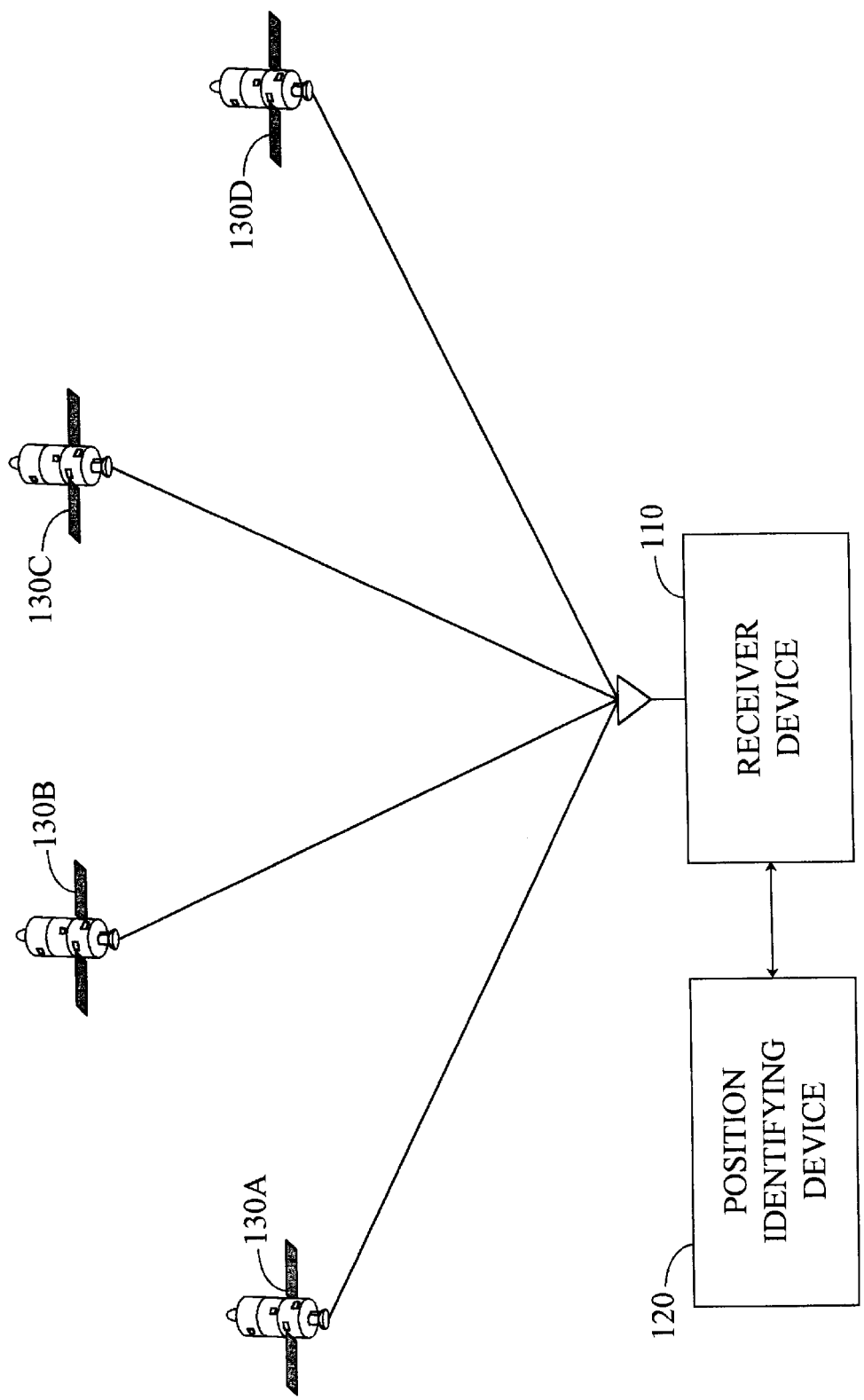
FIG. 1A is a simplified illustration of a system capable of implementing various aspects of the invention.

FIG. 1A is a simplified illustration of a system capable of implementing various aspects of the invention. A receiver device 110, the position of which is to be determined, receives signals transmitted from a plurality of the transmitters 130*a*–130*d* (referenced collectively using reference number "130") via an antenna. The receiver device 110 further communicates with a position identifying device 120, which assists in determining the position of the receiver device, as described in further detail below.

In one embodiment, the receiver device 110 is a cellular telephone capable of receiving signals from the plurality of the transmitters 130. However, the receiver device 110 may be any device capable of determining the arrival times of received signals with respect to a reference time. For example, the receiver device 110 may be a computer terminal having a wireless modem, a stand-alone GPS receiver, a receiver capable of receiving signals from ground-based transmitters, or any other receiver. The transmitters 130 may be any type of transmitter having locations that are known or which can be ascertained. In an embodiment, the transmitters 130 are satellites of a Global Positioning Satellite (GPS) system. In alternative embodiments of the disclosed method and apparatus, the transmitters 130 may be ground-based transmitters (e.g., base stations of a wireless communication system), or a combination of GPS and ground-based transmitters.

The receiver device 110 estimates its position based on the received signals and information indicative of the location of the transmitters 130 from which the received signals were transmitted. Due to various factors, the receiver device 110 may not have current or accurate information regarding the actual location of the transmitters 130. In such case, the position estimate made by the receiver device 110 of its location is coarse and may not have the desired degree of accuracy. The initial coarse position estimate made using less accurate transmitter locations may thereafter be "corrected" to provide a more accurate position estimate of the receiver device using the techniques described herein.

The transmitters 130 can be used as reference points to determine the location of the receiver device 110. By accurately measuring the distances from three transmitters 130, the receiver device 110 can "triangulate" its position. The receiver device 110 determines distance by measuring the time required for a signal to travel from a transmitter 130 to the receiver device 110. By knowing the time the signal is transmitted from the transmitter 130 and observing the time the signal is received by the receiver device 110 (based on its internal clock), the travel time of the signal can be determined. However, the exact amount of time between transmission and reception typically cannot be determined, for example, due to offsets in the two clocks at the transmitter 130 and the receiver device 110. Thus, a "pseudo-range" is typically computed based on the difference between a "reference" time and the time that the signal is received. The reference time may be any time, as long as the reference time is common to all pseudo-range measurements being made (or the pseudo-range measurements can be adjusted to compensate for differences in the reference times used).

In FIG. 1A, the transmitters 130*a* through 130*d* are shown at positions estimated by the receiver device 110 based on less accurate (e.g., not up-to-date) information. These positions may be different from the actual positions of the transmitter 130. In the instance in which the transmitters 130 are satellites, such as GPS satellites, the position of the satellites can be identified by the Almanac and Ephemeris.

An accurate determination of the location of a GPS satellite can be made if the current Ephemeris information and the time of day are available. However, the Ephemeris information is valid for a limited amount of time (e.g., two hours). A less accurate determination of the GPS satellite location can be made if current Almanac information and the time of day are available. However, the Almanac is also valid for a limited amount of time (e.g., one week).

Aspects of the invention provide techniques to accurately determine the location of a receiver device based on an initial coarse position estimate, which may have been derived using less accurate information regarding the location of the transmitters (e.g., an old Almanac or old Ephemeris for the GPS satellites). It should be understood that the initial estimate may be made based upon completely outdated Almanac or Ephemeris information.

Since the pseudo-ranges and locations of the transmitters are used to determine the location of the receiver device, errors or inaccuracies in the locations of the transmitters translate into errors or inaccuracies in the position estimate for the receiver device. Hence, a "coarse" position estimate is derived for the receiver device based on pseudo-ranges to transmitters 130, the position of which may be known with relatively poor accuracy.

In accordance with one embodiment of the disclosed method and apparatus, corrections to the coarse position estimate of receiver device are made based on: (1) more accurate information regarding the location of the transmitters 130; and (2) information regarding the amount of error in the estimates of the location of the transmitters 130 used to derive the coarse position estimate. Techniques to perform the corrections are described in further detail below. In one embodiment, the corrections are made at the position identifying device 120, which may be remotely located with respect to the receiver device 110. However, in other embodiments of the disclosed method and apparatus, the position identifying device 120 may be co-located with the receiver device 110.

Figure 2:
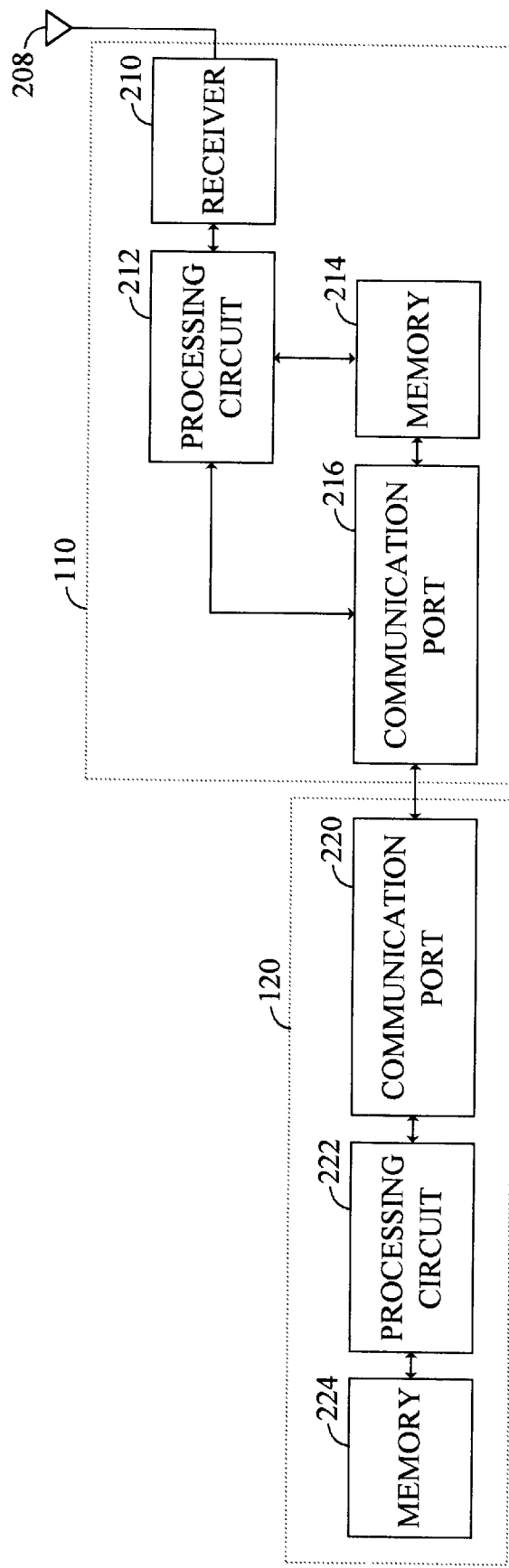
FIG. 2 is a simplified block diagram of the receiver device and the position identifying device in accordance an embodiment of the invention.

FIG. 2 is a simplified block diagram of the receiver device 110 and the position identifying device 120 in accordance with one embodiment of the disclosed method and apparatus. The receiver device 110 may be a component of a remote terminal in a wireless communication system, such as a cellular telephone or a computer with a wireless modem. Alternatively, the receiver device 110 may be a stand-alone position determining unit, such as a stand-alone GPS receiver.

The position identifying device 120 may be a component of a base transceiver subsystem (BTS), a base station controller (BSC), or a mobile switching controller (MSC) in a wireless communication system, or may be a device that couples to one of these elements of the wireless communication system. For example, the position identifying device 120 may be a Position Determining Equipment (PDE) in a wireless communication system. Alternatively, the position identifying device 120 may be a component of, and co-located with, a remote terminal or some other device that includes the receiver device 110. Alternatively, the position identifying device 120 may be a stand alone component.

For simplicity, the receiver device 110 and the position identifying device 120 are shown in FIG. 2 as being directly coupled. However, one or more additional elements (e.g., a BTS, a BSC, and so on) may be coupled between the receiver device 110 and the position identifying device 120. The position identifying device 120 and the receiver device 110 may also be co-located. This may be the case in a system in which accurate information about the location of the transmitters 130 is not available when the measurements are made, but is available at some time in the future. A coarse position estimate for the receiver device 110 may be derived immediately upon making the pseudo-range (or actual range) measurements. The coarse position estimate may be stored until information regarding the more accurate location of the transmitters 130 becomes available, after which a more accurate position estimate for the receiver device may be derived.

In the embodiment shown in FIG. 2, the receiver device 110 includes a receiver 210, a processing circuit 212, a memory 214, and a communications port 216, and further couples to an antenna 208. The antenna 208 receives signals from the transmitters 130 (shown in FIG. 1A) and couples the received signals to the receiver 210. The receiver 210 includes circuitry (e.g., radio frequency (RF) processing circuitry and/or other receiving circuitry) necessary to process the received signals to derive information used for position determination. Such information may include timing information and so on. The information is provided to the processing circuit 212, which performs position determining calculations. Such calculations may include calculations to derive pseudo-ranges to the transmitters 130. Alternatively or additionally, the calculations may include those required to derive an initial coarse estimate of the position of the receiver device 110. The coarse position estimate may have a relatively large error due to large errors in the position estimates of the transmitters 130.

The receiver device 110 provides the results of the calculations and other pertinent information via a communication port 216 to the position identifying device 120. The pertinent information may include the time the received signals were measured, the information used to perform the calculations (e.g., the particular Almanac used to estimate the position of the transmitters 130), and possibly other information. The communication port 216 provides an interface to the position identifying device 120. For a receiver device disposed within a remote terminal of a wireless communication system, the communication port 216 may support communication via a wireless link.

In the embodiment shown in FIG. 2, the position identifying device 120 includes a communication port 220, a processing circuit 222, and a memory 224. The communication port 220 receives the calculation results and pertinent information from the receiver device 110 and forwards the information to the processing circuit 222. The processing circuit 222 receives the calculation results and pertinent information, and further receives a copy of the "less accurate" information that was used by the receiver device 110 to perform the calculations. The less accurate information may be the Almanac (and the time at which the Almanac was valid), the Ephemeris (and the time at which the Ephemeris was valid), and/or any other information that the receiver device 110 may have used to estimate the location of the transmitters 130.

The less accurate information may be provided by the receiver device 110 together with the calculation results, e.g., as part of the pertinent information. In certain embodiments, the less accurate information may not be explicitly provided, and other indicators may be used to deduce the information that was used. For example, the time for which the Almanac or Ephemeris is valid, the time at which the received signals were measured at the receiver device 110, the time at which the coarse position estimate was sent to the position identifying device 120, or some other information (which may be sent as part of the pertinent information), may be sufficient to allow the position identifying device 120 to correctly deduce the transmitter position estimates that were used to derive the coarse position estimate. In some other embodiments, the position identifying device 120 may be responsible for sending to the receiver device 110 the information used to derive the coarse position estimate. For these embodiments, there would be no need for the receiver device 110 to inform the position identifying device 120 what information was used.

In certain embodiments, the processing circuit 212 may communicate directly with the position identifying device 120 without the need for a separate communication port. This may be the case in instances in which the position identifying device 120 and the receiver device 110 are co-located, or may even be possible in certain other instances in which the position identifying device and receiver device are not co-located.

In one embodiment, the position identifying device 120 receives the less accurate information prior to receipt of the calculation results from the receiver device 110. In some embodiments, the less accurate information used by the receiver device 110 may be provided to the position identifying device 120 by a source other than the receiver device 110 (e.g., over a communication link that is not shown in FIG. 2 for simplicity). For example, the less accurate information may be received directly by the position identifying device 120 from the transmitters 130. Alternatively, the less accurate information may be received by the position identifying device 120 from a source that is distinct from any of the components shown in FIG. 1A, such as a component of a base station in a wireless communication system.

In one embodiment, the position identifying device 120 may have multiple sets of information (e.g., several versions of the Almanac), any one of which may have been used by the receiver device 110 to perform the position determining calculations. In this case, the receiver device 110 may need to provide additional information to the position identifying device 120 to indicate what information, from among those available to the position identifying device 120, was specifically used by the receiver device 110 to perform the position determining calculation.

Figure 3:
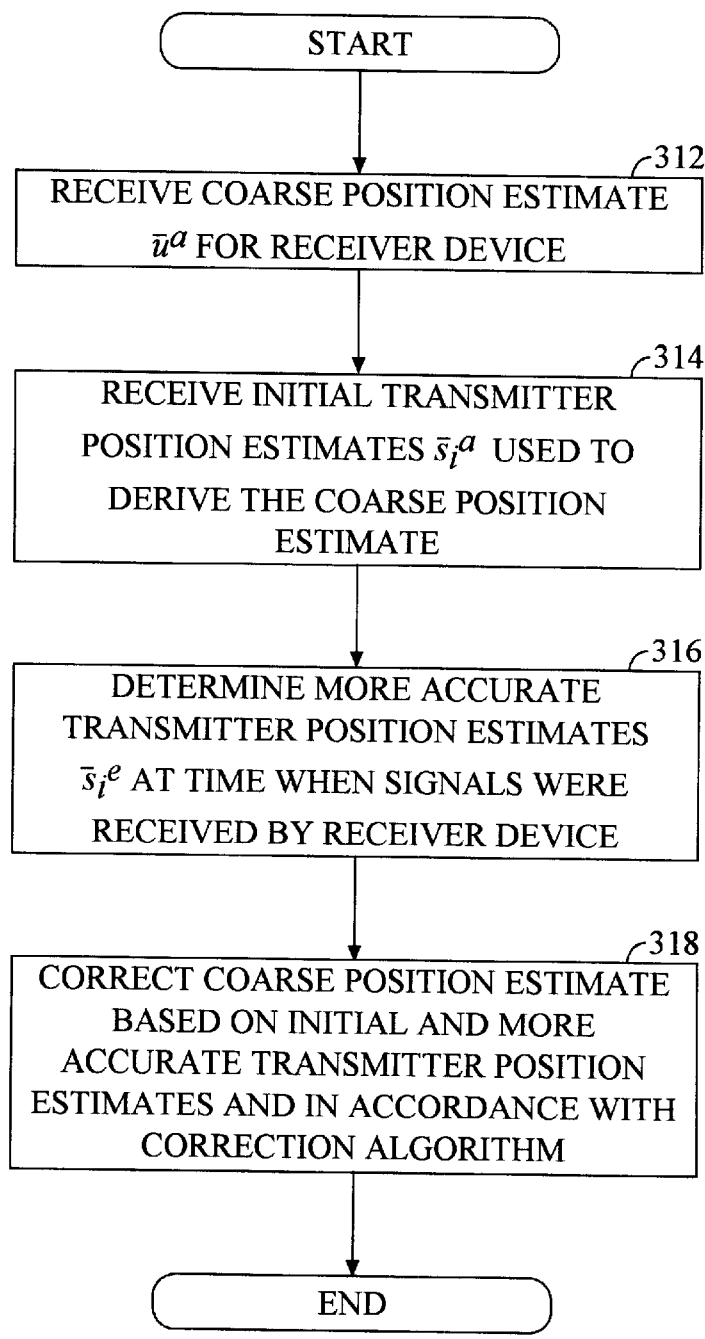
FIG. 3 is a flow diagram illustrating a process performed by the position identifying device to derive a more accurate position estimate for the receiver device based on a coarse position estimate previously derived by the receiver device.

FIG. 3 is a flow diagram illustrating a process performed by the position identifying device 120 to derive a more accurate position estimate for the receiver device 110 based on a coarse position estimate previously derived by the receiver device. The position identifying device 120 initially receives from the receiver device 110 the results of the position determination calculations (e.g., the coarse position estimate $\bar{u}^a$), at step 312. The position identifying device 120 also receives information indicative of the initial position estimates $\bar{s}_i^a$ of the transmitters 130 (i.e., the less accurate transmitter position estimates), which were used to derive the coarse position estimate, at step 314. This information may indicate the version of the Almanac or Ephemeris that was used to derive the coarse position estimate. The initial position estimates for the transmitters 130, as determined by the receiver device 110, are less accurate and correspond to the location where the receiver device 110 assumed the transmitters to be located when making the position determining calculations. In an embodiment, the position identifying device 120 further receives the time at which the pseudo-range measurements were taken, also at step 314.

The position identifying device 120 then determines more accurate estimates $\bar{s}_i^e$ of the location of the transmitters 130, at step 316. These more accurate transmitter position estimates may be made based on an Almanac and/or Ephemeris that is more accurate for the time at which the pseudo-range measurements were made by the receiver device 110. In one embodiment, the position identifying device 120 maintains a log of the Almanac and Ephemeris transmitted by the satellites of the GPS constellation. Such a log allows the position identifying device 120 to use the most accurate Almanac and Ephemeris to correct the coarse position estimate received from the receiver device 110, as described in further detail below.

Once the position identifying device 120 has information regarding the initial less accurate position estimates and the more accurate position estimates for the transmitters 130, the position identifying device 120 then corrects the coarse position estimate for the receiver device 110 in accordance with an algorithm described below, at step 318.

Figure 1B:
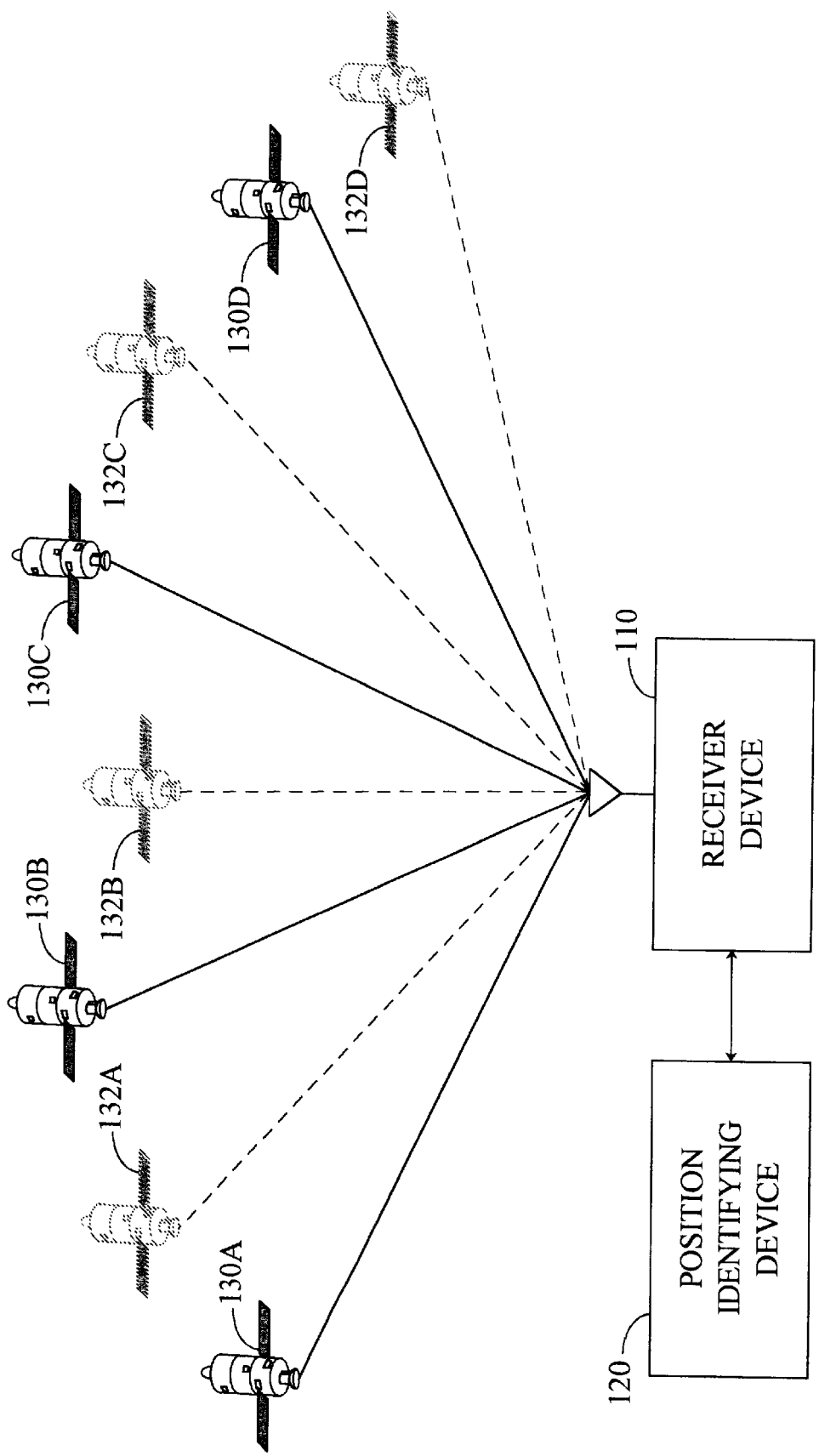
FIG. 1B is a diagram that illustrates the error in the location of the transmitters based on information available to the receiver device.

FIG. 1B is a diagram that illustrates the error in the location of the transmitters 130 based on information available to the receiver device 110. FIG. 1B shows transmitters 132a through 132d at locations that represent the more accurate estimates of the actual location of the transmitters. FIG. 1B also shows the transmitters 130a through 130d at locations that represent less accurate estimates of the location of the transmitters. Transmitter 132 (shown with dashed lines) and the transmitter 130 (shown with solid lines) correspond to two position estimates for the same transmitter. However, the location of each transmitter is perceived to be different depending upon whether the location of the transmitter has been determined using the more or less accurate information (i.e., using Almanac and Ephemeris that is, or is not, accurate for the time at which the pseudo-range measurement was taken). The locations of the transmitters 130 were used by the receiver device 110 to perform the position determining calculations to derive the coarse position estimate for the receiver device 110.

The position identifying device 120 performs corrections on the coarse position estimate from the receiver device 110 to provide a more accurate position estimate for the receiver device. The corrections on the coarse position estimate may be performed based on various algorithms including a "linearized" algorithm, an "iterative algorithm", and possibly others. The linearized algorithm is described in detail in U.S. patent application Ser. No. 09/773,207, entitled "METHOD AND APPARATUS FOR DETERMINING LOCATION USING A COARSE POSITION ESTIMATE," filed Jan. 30, 2001, assigned to the assignee of the present application. The iterative algorithm is described below.

The iterative algorithm can be used to perform corrections on a coarse position estimate for the receiver device 110 based on: (1) knowledge of the less accurate estimates of the location of the transmitters 130 (e.g., GPS satellites) used to derive the coarse position estimate for the receiver device 110, and (2) a knowledge of the more accurate estimates of the actual location of the transmitters 130 at the time the pseudo-range measurements were made. The more accurate transmitter position estimates may be determined based on knowledge of the specific time at which the pseudo-range measurements were taken.

It should be understood that the coarse position estimate is made at either a location or a time when the more accurate estimates of the location of the transmitters 130 are not available. Corrections will typically be performed at either a later time or another location or both, depending upon when and where the more accurate estimates of the position of the transmitters 130 become available.

In one embodiment of the disclosed method and apparatus, it is assumed that there is a one-to-one mapping between a position location solution (i.e., the calculated position for the receiver device 110) derived from a set of more accurate transmitter location estimates and the solution derived from a set of less accurate position transmitter location estimates. This assumption is easily satisfied in the case where there are only four pseudo-range measurements.

For clarity, the iterative algorithm is described specifically for a case in which the transmitters 130 are GPS satellites. However, the iterative algorithm may also be used with any types of transmitter in which inaccurate transmitter location information is available at a particular time or place, and more accurate transmitter location information is available at some later time and/or other location.

The location $\bar{s}_i^a$ for the i-th satellite derived based on the Almanac information and the clock bias may be expressed as:

$$\bar{s}_i^a = \lfloor x_{Si}^a, y_{Si}^a, z_{Si}^a \rfloor \text{ and } b_{Si}^a.$$

Clock bias is defined as the difference between the time indicated by a local clock and reference time, commonly referred to as GPS time. The location, $\bar{s}_i^a$ will typically have a relatively large error due to inaccuracy of the Almanac used by the receiver device 110 to derive the location, $\bar{s}_i^a$.

The location, $\bar{s}_i^e$ calculated for the i-th satellite based on the Ephemeris information and the clock bias may be expressed as:

$$\bar{s}_i^e = \lfloor x_{Si}^e, y_{Si}^e, z_{Si}^e \rfloor \text{ and } b_{Si}^e.$$

The location, $\bar{s}_i^e$ will typically have a relatively small error due to the use of the more accurate Ephemeris information. The coarse position estimate, $\bar{u}^a$ derived by the receiver device 110 using the relatively less accurate Almanac information may be expressed as:

$$\bar{u}^a = \lfloor x_u^a, y_u^a, z_u^a, b_u^a, \rfloor.$$

A more accurate position estimate $\bar{u}^e$ of the receiver device 110 derived by the receiver device 110 using the relatively more accurate transmitter location estimates may be expressed as:

$\bar{u}^e = [x_u^e, y_u^e, z_u^e, b_u^e]$.

The value of the estimate $\bar{u}^e$ is set to $\bar{u}^a$ or an estimate from another source, such as an ancillary position location system, prior to a first iteration. The position estimate $\bar{u}^e$ is thereafter updated as a result of further iterations.

A pseudo-range estimate associated with each satellite may be obtained based on the following expression:

$$m_i = \sqrt{(x_u^e - x_{Si}^e)^2 + (y_u^e - y_{Si}^e)^2 + (z_u^e - z_{Si}^e)^2} - (b_u^e - b_{Si}^e). \quad \text{Eq (1)}$$

These estimates are essentially pseudo-range measurements that would have been measured by a receiving device located at $\bar{u}^e$ receiving signals from transmitters located at the locations indicated by the more accurate information. It can be seen that the measurement, $m_i$ of equation (1) is the distance between the more accurate position estimate $\bar{u}^e$ of the receiver device 110 and the more accurate position estimate $\bar{s}_i^e$ of one of the transmitters 130, taking into account the clock bias. Based on the range values of $m_i$ calculated to each satellite, a least mean square (LMS) computation can be performed to determine the position $\bar{u}' = [x'_u, y'_u, z'_u, b'_u]$ that the receiver device 110 would have calculated if it had been at the location $\bar{u}^e$ and had assumed the transmitters 130 to be at the position indicated by the less accurate position estimates, $\bar{s}_i^a$ for the transmitters 130 (i.e., the positions indicated by the Almanac information). Based on this position estimate $\bar{u}'$ and the relationship between $\bar{u}^e$ and $\bar{u}^a$, an update vector $d\bar{u}$ can be determined, as will be described in more detail below.

A geometry matrix $H_a$ for the less accurate transmitter position estimates $\bar{s}_i^a$ (e.g., Almanac-derived satellite locations) and the corresponding location $\bar{u}'$ derived from the previous LMS computation can be defined as:

$$H_e = \begin{bmatrix} \frac{x'_u - x_{S1}^a}{|\bar{u}' - \bar{s}_1^a|} & \frac{y'_u - y_{S1}^a}{|\bar{u}' - \bar{s}_1^a|} & \frac{z'_u - z_{S1}^a}{|\bar{u}' - \bar{s}_1^a|} & -1 \\ \frac{x'_u - x_{S2}^a}{|\bar{u}' - \bar{s}_2^a|} & \frac{y'_u - y_{S2}^a}{|\bar{u}' - \bar{s}_2^a|} & \frac{z'_u - z_{S2}^a}{|\bar{u}' - \bar{s}_2^a|} & -1 \\ M & M & M & M \\ \frac{x'_u - x_{Sn}^a}{|\bar{u}' - \bar{s}_n^a|} & \frac{y'_u - y_{Sn}^a}{|\bar{u}' - \bar{s}_n^a|} & \frac{z'_u - z_{Sn}^a}{|\bar{u}' - \bar{s}_n^a|} & -1 \end{bmatrix}. \quad \text{Eq (2)}$$

where n is the number of measurements used.

Similarly, a geometry matrix $H_e$ for the more accurate transmitter position estimates $\bar{s}_i^e$ (e.g., the Ephemeris-derived satellite locations) and the more accurate receiver device position estimate $\bar{u}^e$ can be defined as:

$$H_e = \begin{bmatrix} \frac{x_u^e - x_{S1}^e}{|\bar{u}^e - \bar{s}_1^e|} & \frac{y_u^e - y_{S1}^e}{|\bar{u}^e - \bar{s}_1^e|} & \frac{z_u^e - z_{S1}^e}{|\bar{u}^e - \bar{s}_1^e|} & -1 \\ \frac{x_u^e - x_{S2}^e}{|\bar{u}^e - \bar{s}_2^e|} & \frac{y_u^e - y_{S2}^e}{|\bar{u}^e - \bar{s}_2^e|} & \frac{z_u^e - z_{S2}^e}{|\bar{u}^e - \bar{s}_2^e|} & -1 \\ M & M & M & M \\ \frac{x_u^e - x_{Sn}^e}{|\bar{u}^e - \bar{s}_n^e|} & \frac{y_u^e - y_{Sn}^e}{|\bar{u}^e - \bar{s}_n^e|} & \frac{z_u^e - z_{Sn}^e}{|\bar{u}^e - \bar{s}_n^e|} & -1 \end{bmatrix}. \quad \text{Eq (3)}$$

A final geometry matrix $H_t$ can then be expressed as:

$$H_t = (H_a^T \cdot R^{-1} \cdot H_a)^{-1} \cdot H_a^T \cdot H_e, \quad \text{Eq (4)}$$

where R is the covariance matrix of the measurements, i.e., $R = E[\bar{m} \cdot \bar{m}^T]$ where $E[\ ]$ represents calculating the statistical expectation of the quantity in the brackets and $\bar{m}$ is the vector of measurements determined in equation (1). The update vector $d\bar{u}$ can then be expressed as:

$$d\bar{u} = (H_t^T \cdot R^{-1} \cdot H_t)^{-1} \cdot H_t^T \cdot (\bar{u}_a - \bar{u}'). \quad \text{Eq(5)}$$

The more accurate estimate $\bar{u}^e$ of the receiver device's position obtained using the more accurate transmitter position estimates $\bar{s}_i^e$ (e.g., the Ephemeris-derived satellite position), can be expressed as:

$$\bar{u}^e = \bar{u}^a + d\bar{u}. \quad \text{Eq(6)}$$

Equations (1) through (6) can be applied iteratively a number of times to derive a more and more accurate position estimate for the receiver device 110.

Figure 4:
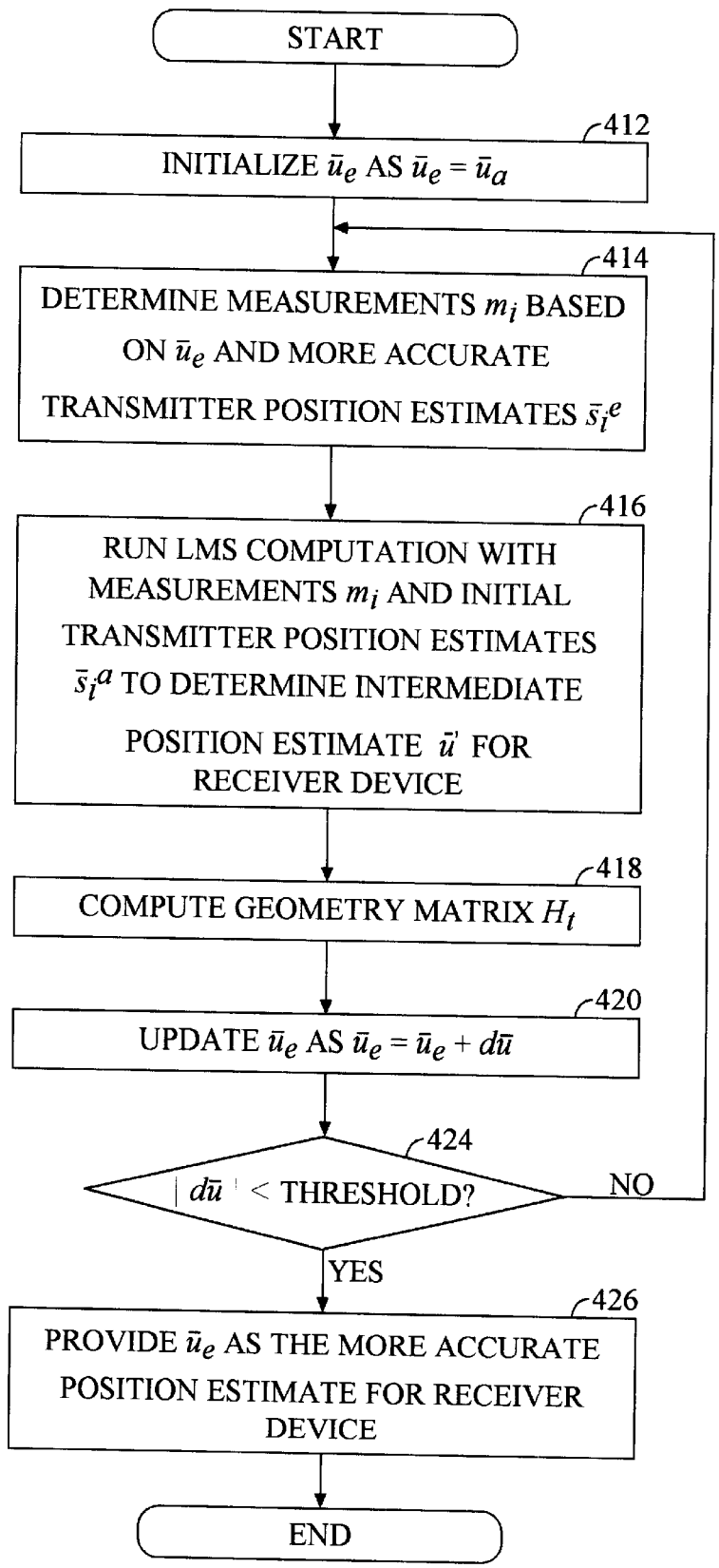
FIG. 4 is a flow diagram of the processing performed for the iterative algorithm, in accordance with an embodiment of the invention.

FIG. 4 is a flow diagram of the processing performed for the iterative algorithm, in accordance with an embodiment of the invention. The coarse position estimate $\bar{u}^a$ derived by the receiver device 110 based on less accurate position estimates $\bar{s}_i^a$ of the transmitters 130 is first received (as described in FIG. 3). The more accurate position estimate $\bar{u}^e$ for the receiver device 110 is initialized to the coarse position estimate $\bar{u}^a$, at step 412. Pseudo-range measurements $m_i$ are then determined, at step 414. These measurements are the ones that would have been obtained if the position estimate $\bar{u}^e$ were the solution. The measurements $m_i$ can be derived based on equation (1) and can be determined for all transmitters previously used to derive the coarse position estimate $\bar{u}^a$.

At step 416, an LMS computation is performed based on the measurements $m_i$ determined in step 414 and the less accurate transmitter position estimates $\bar{s}_i^a$. The LMS computation can be achieved in a manner known in the art. The resulting solution from the LMS computation is denoted as $\bar{u}'$, which is the solution that the receiver device 110 would have obtained if it had been at location $\bar{u}^e$.

The geometry matrix $H_t$ is then computed in accordance with equations (2), (3) and (4), at step 418. The update vector $d\bar{u}$ can then be determined based on the geometry matrix $H_t$ and the difference in position estimates (i.e., $\bar{u}^a - \bar{u}'$) and in accordance with equation (5). The more accurate position estimate $\bar{u}^e$ is then updated with the update vector $d\bar{u}$, at step 420.

At step 424, a determination is made whether or not the magnitude of the update vector $d\bar{u}$ is less than a particular threshold (e.g., $|d\bar{u}| < 1$). If the magnitude of the update vector $d\bar{u}$ is not less than the threshold, the process returns to step 414 and the hypothetical measurements $m_i$ of the transmitters 130 are again calculated based on the recently updated more accurate position estimate $\bar{u}^e$ for the receiver device 110. Steps 414 through 424 are repeated as many times as necessary until the magnitude of the update vector $d\bar{u}$ is less than the threshold. Once the threshold is satisfied, the position estimate $\bar{u}^e$ is returned as the more accurate location estimate for the receiver device 110. The processing then terminates.

The techniques described herein allow the location of a receiver device to be accurately determined based on a coarse location estimate for the receiver device, which may have been derived based on less accurate position estimates for the transmitters. In this manner, the information descriptive of the location of the transmitters (e.g., the Almanac) may be loaded infrequently into the receiver device, which may allow for conservation of resources.

The techniques described herein may also be used advantageously for determining the position of a receiver device operating in an asynchronous mode, which is characterized by the time stamp of the measurements not being known with sufficient accuracy (e.g., more than 5 msec of time stamp error).

In accordance with an aspect of the invention, measurements for five or more transmitters (e.g., GPS satellites) may be used to solve for x, y, z, and clock bias as well as the time-stamp error. The correction algorithm described above can be made applicable for cases where the time-stamp reported by the receiver device is not accurate.

The iterative algorithm described above can be implemented for position determining calculations based on five or more measurements. The computations described above in equations (1) through (6) and the flow diagram shown in FIG. 4 can be applied in the manner described above. However, instead of the LMS algorithm normally used for four measurements, a modified LMS algorithm is implemented to operate on five unknowns to derive the solution (i.e., the position estimate for the receiver device). Instead of n by 4 geometry matrices $H_a$ and $H_e$ respectively shown in equations (2) and (3), these matrices are n by 5, where n is again have a dimensionality corresponding to the number of measurements used.

When at least five measurements are used for the position determining calculations, the n by 5 geometry matrices $H_{a,5}$ can be expressed as:

$$H_e = \begin{bmatrix} \frac{x_u^e - x_{S1}^e}{|\bar{u}^e - \bar{s}_1^e|} & \frac{y_u^e - y_{S1}^e}{|\bar{u}^e - \bar{s}_1^e|} & \frac{z_u^e - z_{S1}^e}{|\bar{u}^e - \bar{s}_1^e|} & -1 \\ \frac{x_u^e - x_{S2}^e}{|\bar{u}^e - \bar{s}_2^e|} & \frac{y_u^e - y_{S2}^e}{|\bar{u}^e - \bar{s}_2^e|} & \frac{z_u^e - z_{S2}^e}{|\bar{u}^e - \bar{s}_2^e|} & -1 \\ M & M & M & M \\ \frac{x_u^e - x_{Sn}^e}{|\bar{u}^e - \bar{s}_n^e|} & \frac{y_u^e - y_{Sn}^e}{|\bar{u}^e - \bar{s}_n^e|} & \frac{z_u^e - z_{Sn}^e}{|\bar{u}^e - \bar{s}_n^e|} & -1 \end{bmatrix}. \quad \text{Eq (3)}$$

The first four columns of the above matrix $H_{a,5}$ are the same as that shown above in equation (2) and the fifth column comprises the partial derivative $$\frac{\partial \rho_{Si}^a}{\partial t} = \frac{\frac{\partial x_{Si}^a}{\partial t}\bigg|_{t=t_k}(x_{Si}^a(t_k)-x_u^a) + \frac{\partial y_{Si}^a}{\partial t}\bigg|_{t=t_k}(y_{Si}^a(t_k)-y_u^a) + \frac{\partial z_{Si}^a}{\partial t}\bigg|_{t=t_k}(z_{Si}^a(t_k)-z_u^a)}{\sqrt{(x_{Si}^a(t_k)-x_u^a)^2 + (y_{Si}^a(t_k)-y_u^a)^2 + (z_{Si}^a(t_k)-z_u^a)^2}}.$$

of each transmitter's pseudo-range measurement with respect to the time-stamp. This partial derivative for the i-th transmitter may be expressed as:

$$\frac{\partial \rho_{Si}^a}{\partial t}$$

Similarly, the geometry matrices $H_{e,5}$ for at least five measurements can be expressed as:

$$H_{e,5} = \begin{bmatrix} \frac{x_u^e - x_{S1}^e}{|\bar{u}^e - \bar{s}_1^e|} & \frac{y_u^e - y_{S1}^e}{|\bar{u}^e - \bar{s}_1^e|} & \frac{z_u^e - z_{S1}^e}{|\bar{u}^e - \bar{s}_1^e|} & -1 & \frac{\partial \rho_{S1}^e}{\partial t} \\ \frac{x_u^e - x_{S2}^e}{|\bar{u}^e - \bar{s}_2^e|} & \frac{y_u^e - y_{S2}^e}{|\bar{u}^e - \bar{s}_2^e|} & \frac{z_u^e - z_{S2}^e}{|\bar{u}^e - \bar{s}_2^e|} & -1 & \frac{\partial \rho_{S1}^e}{\partial t} \\ \vdots & \vdots & \vdots & \vdots & \vdots \\ \frac{x_u^e - x_{Sn}^e}{|\bar{u}^e - \bar{s}_n^e|} & \frac{y_u^e - y_{Sn}^e}{|\bar{u}^e - \bar{s}_n^e|} & \frac{z_u^e - z_{Sn}^e}{|\bar{u}^e - \bar{s}_n^e|} & -1 & \frac{\partial \rho_{S1}^e}{\partial t} \end{bmatrix}.$$

Again, the first four columns of the above matrix $H_{e,5}$ are the same as that shown above in equation (3) and the fifth column comprises the partial derivative $$\frac{\partial \rho_{Si}^e}{\partial t}$$

of each transmitter's pseudo-range measurement with respect to the time-stamp. This partial derivative for the i-th transmitter may be expressed as:

$$\frac{\partial \rho_{Si}^e}{\partial t} = \frac{\frac{\partial x_{Si}^e}{\partial t}\bigg|_{t=t_k}(x_{Si}^e(t_k)-x_u^e) + \frac{\partial y_{Si}^e}{\partial t}\bigg|_{t=t_k}(y_{Si}^e(t_k)-y_u^e) + \frac{\partial z_{Si}^e}{\partial t}\bigg|_{t=t_k}(z_{Si}^e(t_k)-z_u^e)}{\sqrt{(x_{Si}^e(t_k)-x_u^e)^2 + (y_{Si}^e(t_k)-y_u^e)^2 + (z_{Si}^e(t_k)-z_u^e)^2}}.$$

The partial derivatives $$\left(\text{e.g.,}\ \frac{\partial x_{Si}^a}{\partial t}, \frac{\partial y_{Si}^a}{\partial t}, \text{and}\ \frac{\partial y_{Si}^a}{\partial t}\right)$$

of each satellite's coordinate with respect to the measurement time can be derived from the Almanac or Ephemeris accordingly, since they described the satellite's trajectory as a function of time. For the above equations, $t_k$ is the estimate of the measurement time at the $k^{th}$ iteration. From the above equations, at each iteration, the satellite positions are recomputed based on the new value of the measurement time t, which may be obtained from the measurement time error that is one of the unknowns whose value is reassessed at each iteration.

The position determining calculations for the asynchronous mode is described in further detail in U.S. patent application Ser. No. 09/280,337, entitled "METHOD AND APPARATUS FOR LOCATING GPS EQUIPPED WIRELESS DEVICES OPERATING IN ANALOG MODE," filed Mar. 29, 1999, assigned to the assignee of the present application.

In FIG. 2, processing circuits 212 and 222 may derive the initial coarse position estimate and the more accurate position estimate for the receiver device 110, respectively, by executing program instructions stored within memories 214 and 224, respectively. Processing circuits 212 and 214 may each be implemented as a digital signal processor (DSP), an application specific integrated circuit (ASIC), a processor, a microprocessor, a controller, a microcontroller, a field programmable gate array (FPGA), a programmable logic device, other electronic unit, or any combination thereof designed to perform the functions described herein. Processing circuits 212 and 222 may each further include memory 212 or 224 used to store program instructions and data.

The disclosed method and apparatus is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the broadest scope that is consistent with the disclosed principles and novel features.

What is claimed is:

1. A computer program product for determining the location of a device, comprising:
   (a) computer readable instructions for receiving a coarse position estimate for the device based in part on initial estimates of the positions of a plurality of transmitters;
   (b) computer readable instructions for receiving revised position estimates for the transmitters;
   (c) computer readable instructions for correcting the coarse position estimate an iterative algorithm comprising:
      (i) initializing the value of a variable representing a current more accurate position location estimate such that the variable is made to be equal to the coarse position estimate;
      (ii) determining pseudo range measurements equal to those that would be measured by the device if the device were located at the current more accurate position location and the transmitters were located at the relatively more accurate location of the plurality of transmitters;
      (iii) computing a least mean square to determine the position $\bar{u}'=[x'_u \ y'_u \ z'_u \ b'_u]$ that the receiver device would have calculated itself to be at, if it had been at the current more accurate position location and the transmitters had been at the position indicated by the initial estimates of the position of the plurality of transmitters;
      (iv) defining a geometry matrix $H_a$, and a geometry matrix $H_e$;
      (v) generating a final geometry matrix $H_f$;
      (vi) computing an update vector from the final geometry matrix; and
      (vii) obtaining a new value for the current more accurate position location by adding the update vector to the old value of the current more accurate position location
   (d) initializing a revised position estimate for the device;
   (e) computer readable instructions for computing an update vector based on the revised position estimate for the device and the initial and revised position estimates for the transmitters;
   (f) computer readable instructions for updating the revised position estimate for the device based on the update vector;
   (g) computer readable instructions for repeating the computing and updating a plurality of times, and
   (h) a data storage medium configured to store the codes.

2. A position identifying device comprising:
   (a) a communication port configured to receive a coarse position estimate for a receiver device based in part on initial estimates of the positions of a plurality of transmitters; and
   (b) a processor operatively coupled to the communication port and configured to:
      (i) receive a coarse position estimate of the location of the device, the estimate having been calculated using initial estimates of the position of a plurality of transmitters;
      (ii) receive information providing a relatively more accurate location of the plurality of transmitters; and
      (iii) correct the coarse position estimate using an iterative algorithm comprising:
         (1) initializing the value of a variable representing a current more accurate position location estimate such that the variable is made to be equal to the coarse position estimate;
         (2) determining pseudo range measurements equal to those that would be measured by the device if the device were located at the current more accurate position location and the transmitters were located at the relatively more accurate location of the plurality of transmitters;
         (3) computing a least mean square to determine the position $\bar{u}'=[x'_u \ y'_u \ z'_u \ b'_u]$ that the receiver device would have calculated itself to be at, if it had been at the current more accurate position location and the transmitters had been at the position indicated by the initial estimates of the position of the plurality of transmitters;
         (4) defining a geometry matrix $H_a$, and a geometry matrix $H_e$,
         (5) generating a final geometry matrix $H_f$;
         (6) computing an update vector from the final geometry matrix; and
         (7) obtaining a new value for the current more accurate position location by adding the update vector to the old value of the current more accurate position location.

3. The position identifying device of claim 2, further comprising:
   (a) a memory operatively coupled to the processor and configured to store a plurality of sets of information indicative of position estimates for the transmitters at a plurality of time instances, and wherein the revised position estimates for the transmitters are derived from one of the sets of information.

4. The position identifying device of claim 2, wherein the communication port is further configured to receive information indicative of a particular time at which signals from the transmitters were measured and used to derive the coarse position estimate for the receiver device.

5. A method for determining the location of a device, comprising:
   (a) receiving a coarse position estimate of the location of the device, the estimate having been calculated using initial estimates of the position of a plurality of transmitters;
   (b) receiving information providing a relatively more accurate location of the plurality of transmitters; and
   (c) correcting the coarse position estimate using an iterative algorithm comprising:
      (i) initializing the value of a variable representing a current more accurate position location estimate such that the variable is made to be equal to the coarse position estimate;
      (ii) determining pseudo range measurements equal to those that would be measured by the device if the device were located at the current more accurate position location and the transmitters were located at the relatively more accurate location of the plurality of transmitters;

(iii) computing a least mean square to determine the position $\bar{u}'=[x'_u\ y'_u\ z'_u\ b'_u]$ that the receiver device would have calculated itself to be at, if it had been at the current more accurate position location and the transmitters had been at the position indicated by the initial estimates of the position of the plurality of transmitters;

(iv) defining a geometry matrix $H_a$, and a geometry matrix $H_e$;

(v) generating a final geometry matrix $H_f$;

(vi) computing an update vector from the final geometry matrix; and (vii) obtaining a new value for the current more accurate position location by adding the update vector to the old value of the current more accurate position location.

6. The method of claim 5 wherein steps (b) through (e) are repeated until the magnitude of the update vector is within a particular threshold.

7. The method of claim 6, wherein the initial estimates of the position of a plurality of transmitters are based on Almanac data.

8. The method of claim 6 wherein the information providing a relatively more accurate location of the plurality of transmitters is Ephemeris data.

9. The method of claim 5 wherein the position estimate for the device is based on five or more measurements to account for uncertainty in the time at which the measurements were made at the device.

* * * * *